United States Patent [19]

Kim

[11] Patent Number: 5,540,067

[45] Date of Patent: Jul. 30, 1996

[54] ANTI-THEFT DEVICE FOR AUTOMOBILES AND AIRBAGS

[76] Inventor: Ki I. Kim, 826 S. Berando St., Apt. 1, Los Angeles, Calif. 90005

[21] Appl. No.: 377,751

[22] Filed: Jan. 25, 1995

[51] Int. Cl.⁶ .............................................. B60R 25/02
[52] U.S. Cl. .................... 70/209; 70/226; 70/DIG. 49; 70/163
[58] Field of Search ........................... 70/209, 211, 212, 70/226, 225, 237, 238, 158, 163–172, DIG. 49

[56] References Cited

U.S. PATENT DOCUMENTS

| | | | |
|---|---|---|---|
| 1,154,389 | 9/1915 | Fogalsang | 70/209 |
| 1,329,913 | 2/1920 | McGuire | 70/212 |
| 1,368,054 | 2/1921 | Recher | 70/212 |
| 1,395,532 | 11/1921 | Tilden | 70/212 |
| 3,462,982 | 8/1969 | Moore . | |
| 3,742,743 | 7/1973 | Stoyanovitch | 70/209 |
| 3,982,602 | 9/1976 | Gorman . | |
| 4,103,524 | 8/1978 | Mitchell et al. | 70/209 |
| 4,598,562 | 7/1986 | Freeman | 70/237 |
| 4,856,308 | 8/1989 | Johnson et al. | 70/209 |
| 4,949,561 | 8/1990 | Solow et al. | 70/209 |
| 4,970,884 | 11/1990 | Solow | 70/209 |
| 5,007,259 | 4/1991 | Mellard | 70/209 |
| 5,022,246 | 6/1991 | Wang et al. | 70/209 |
| 5,025,646 | 6/1991 | Waguespack, Jr. | 70/209 |
| 5,052,201 | 10/1991 | Liou | 70/209 |
| 5,055,823 | 10/1991 | Fuller | 340/426 |
| 5,069,048 | 12/1991 | Lo | 70/209 |
| 5,095,723 | 3/1992 | Lin | 70/209 |
| 5,097,685 | 3/1992 | Lien | 70/209 |
| 5,099,663 | 3/1992 | Dearstine | 70/77 |
| 5,099,664 | 3/1992 | Wen-Yin | 70/209 |
| 5,113,672 | 5/1992 | Wang | 70/209 |
| 5,113,673 | 5/1992 | Shen | 70/209 |
| 5,113,674 | 5/1992 | LiCausi | 70/209 |
| 5,115,652 | 5/1992 | Starmer | 70/209 |
| 5,121,617 | 6/1992 | Chen | 70/209 |
| 5,144,822 | 9/1992 | Jan et al. | 70/209 |
| 5,157,951 | 10/1992 | Chen et al. | 70/209 |
| 5,163,309 | 11/1992 | Wu | 70/209 |
| 5,168,732 | 12/1992 | Chen et al. | 70/209 |
| 5,174,138 | 12/1992 | Shen | 70/209 |
| 5,197,308 | 3/1993 | Pazik | 70/209 |
| 5,199,283 | 4/1993 | Chen | 70/209 |
| 5,211,041 | 5/1993 | Hsu | 70/209 |
| 5,211,042 | 5/1993 | Watanuki | 70/252 |
| 5,239,849 | 8/1993 | Gallardo | 70/209 |
| 5,255,544 | 10/1993 | Wu | 70/209 |
| 5,275,030 | 1/1994 | Cole | 70/209 |
| 5,277,042 | 1/1994 | Tobias | 70/209 |
| 5,297,406 | 3/1994 | Lin | 70/209 |
| 5,299,438 | 4/1994 | Chen | 70/209 |
| 5,329,793 | 7/1994 | Chen | 70/209 |
| 5,329,794 | 7/1994 | Lo | 70/209 |
| 5,353,614 | 10/1994 | Anderson | 70/211 |
| 5,454,240 | 10/1995 | Whitney | 70/209 |

FOREIGN PATENT DOCUMENTS

| | | |
|---|---|---|
| 919367 | 3/1947 | France . |
| 2487275 | 7/1980 | France . |
| 2501134 | 3/1981 | France . |
| 684481 | 11/1939 | Germany . |
| 361686 | 12/1931 | United Kingdom . |

*Primary Examiner*—Darnell M. Boucher
*Attorney, Agent, or Firm*—Stetina, Brunda & Buyan

[57] ABSTRACT

A device for deterring theft of a steering wheel mounted airbag and an automobile comprises a cover configured to generally cover a substantial portion of a steering wheel so as to inhibit access to an airbag mounted within the steering wheel, and also so as to inhibit use of the steering wheel. A lock inhibits removal of the cover when the lock is in the locked configuration thereof and facilitates removal of the cover when the lock is in the unlocked configuration thereof. Thus, the device deters theft of the airbag by preventing a thief from having access thereto and deters theft of the automobile by preventing the thief from driving the automobile.

4 Claims, 7 Drawing Sheets

ANTI-THEFT DEVICE FOR AUTOMOBILES AND AIRBAGS

FIELD OF THE INVENTION

The present invention relates generally to anti-theft devices and more particularly to a device for deterring the theft of a steering wheel mounted airbag and/or an automobile.

BACKGROUND OF THE INVENTION

Anti-theft devices for automobiles are well known. Such devices typically either sound an alarm in response to an attempt to steal an automobile or they attempt to physically inhibit theft of the automobile. Devices which attempt to physically inhibit theft of the automobile include steering column locks, brake/gear shift locks, brake/steering wheel locks, and various devices which attach to the steering wheel so as to inhibit its unauthorized use.

One example of a device which attaches to a steering wheel is disclosed in U.S. Pat. No. 5,115,652. One end of this device passes under the rim of the steering wheel while the other end of the device is locked to a diametrically opposed portion of the rim of the steering wheel. The device passes over the steering wheel hub.

Although such devices which attach to the steering wheel are convenient to use and are generally effective in deterring theft of the automobile, such devices suffer from inherent deficiencies. As those skilled in the art will appreciate, such devices do not afford the degree of security generally desired. For example, it is generally possible to remove such devices by merely cutting the steering wheel and sliding the locked portion of the device off through the cut.

The theft of airbags from automobiles is becoming increasingly prevalent due to their high value and the ease with which they may typically be stolen. Thus, airbags are commonly stolen from vehicles, and subsequently resold to automotive parts stores and repair facilities.

Additionally, such contemporary steering wheel mounted anti-theft devices typically do not provide sufficient coverage of the steering wheel hub so as to prevent theft of an airbag mounted therein. Even if the steering wheel hub is sufficiently covered by the device, the device may simply be removed by cutting the steering wheel, as discussed above.

Thus, although the prior art has generally recognized the problem of preventing automobile theft, the solutions have, to date, been ineffective in providing a satisfactory remedy.

SUMMARY OF THE INVENTION

The present invention specifically addresses and alleviates the above-mentioned deficiencies associated with the prior art. More particularly, the present invention comprises a device for deterring theft of a steering wheel mounted airbag and/or an automobile. The device comprises a cover configured to generally enclose a substantial portion of a steering wheel so as to inhibit access to an airbag mounted within the steering wheel and also so as to inhibit use of the steering wheel. A lock, having locked and unlocked positions, is formed to the cover. The lock and the cover are configured so as to inhibit unauthorized removal of the cover from the steering wheel when the lock is in the locked configuration thereof and so as to facilitate easy removal of the cover from the steering wheel when the lock is in the unlocked configuration thereof.

The cover deters theft of the airbag by inhibiting access thereto, since the cover completely protects the hub of the steering wheel where such airbags are located. The device deters theft of the automobile by inhibiting use of the steering wheel.

The cover is preferably configured so as to fit loosely upon the steering wheel such that turning the steering wheel cover does not substantially turn the steering wheel. Thus, a thief attempting to steal the automobile cannot properly use the steering wheel and the automobile cannot be driven.

Optionally, a plurality of rollers are disposed about the inner periphery of the cover so as to contact the steering wheel in a manner which facilitates turning of the cover without substantially turning the steering wheel. That is, as the steering wheel cover is turned, the rollers function as roller bearings so as to allow the steering wheel to remain substantially stationary. Again, this inhibits proper use of the steering wheel as long as the steering wheel cover is in place.

Optionally, an alarm is provided so as to sound if an attempt is made to remove the cover from the steering wheel without unlocking the lock. The alarm may either be housed within the steering wheel cover or attached thereto. The alarm may be deactivated either by unlocking the lock which maintains the steering wheel cover upon the steering wheel or, alternatively, may be disabled via a separate lock or keypad. Optionally, either the same keypad as that utilized to deactivate the alarm, or a different keypad, may similarly be utilized to effect unlocking of the cover, so as to facilitate removal thereof from the steering wheel.

The cover is configured so as to enclose a substantial portion of the steering wheel such that it cannot be removed therefrom without first being unlocked. In the preferred embodiment of the invention, the cover completely encloses that portion of the steering wheel facing the driver and at least partially encloses the opposite surface thereof. Thus, the cover comprises a lip which encircles the rim of the steering wheel. The lip preferably encircles or wraps around the rim of the steering wheel by at least 120 degrees so as to capture the steering wheel and thereby prevent removal of the cover without the unlocking thereof. Preferably, the lip encircles the steering wheel by approximately 180 degrees, so as to form parallel front and rear surfaces of the cover, thus giving the periphery of the cover a generally U-shaped, cross-sectional configuration.

By forming the cover so as to enclose the rim of the steering wheel in such a manner, a thief is effectively denied access to the rim of the steering wheel and is thus prevented from cutting the steering wheel in a manner which allows the cover to be removed therefrom. Thus, the unauthorized removal of the anti-theft device of the present invention cannot be easily accomplished with simple hand tools.

Optionally, a bar is attached to the cover so as to extend therefrom in a manner which inhibits rotation of the cover, and thus further inhibits use of the steering wheel. The bar may extend from the cover in any direction which inhibits use of the steering wheel. The bar is preferably positioned so as to strike a portion of the automobile, e.g., the dashboard, when an attempt is made to rotate the steering wheel. The bar may alternatively be configured to strike the driver when an attempt is made to rotate the steering wheel. Thus, the bar may protrude perpendicularly, i.e., generally axially, from the rear (away from the driver) surface of the cover, or alternatively may protrude radially from the cover. Optionally, a plurality of such bars may be utilized.

In a preferred embodiment of the present invention, the cover comprises front and rear surfaces, each of which have an opening formed therein through which the bar is extendable. A pivot pin is formed proximate the opening in the front surface, to which the bar is pivotally attached via a slot formed in the bar such that the bar is pivotable between a first position in laminar juxtaposition to the front surface of the cover and a second position wherein the bar is received within the openings formed in the front and rear surfaces of the cover so as to extend from the rear surface of the cover and thereby inhibit rotation of the steering wheel.

To move the bar from the first position to the second position thereof, the bar is rotated approximately 90 degrees about the pivot pin from the first position thereof to an intermediate position wherein the bar is in axial alignment with the openings in the first and second surfaces. Next, the bar is slid axially through the openings in the first and second surfaces of the cover, as the pivot pin slides along the slot formed in the bar. Detent means maintain the bar in the first position thereof, prior to its being rotated and inserted through the openings in the first and second surfaces of the cover, and a locking means, preferably the same lock utilized to secure the cover to the steering wheel, secures the bar in the extended or second position thereof.

In a first embodiment of the present invention, the cover comprises a generally semicircular first cover section and a similar, generally semicircular, second Cover section which is pivotally attached to the first cover section and movable between a stowed position generally within the first cover section and a deployed position juxtaposed to the first cover section such that the first and second cover sections, taken together, generally define a circular housing within which a steering wheel is capturable. A pivot pin interconnects the first and second cover sections so as to facilitate movement of the second cover section between the stowed and deployed positions thereof.

In a second embodiment of the present invention, the cover comprises a generally semicircular first cover section and a generally semicircular second cover section hingedly attached to the first cover section in a generally clam shell-like fashion such that the second cover section has an open position separated sufficiently from the first cover section such that the steering wheel is receivable within the first cover section and has a closed position such that the first and second cover sections generally define a circular housing within which the steering wheel is capturable.

In a third embodiment of the present invention, the cover comprises a generally semicircular first cover section and a generally semicircular second cover section removably attachable to the first cover section such that the first and second cover sections generally define a circular housing within which a steering wheel is capturable.

In a fourth embodiment of the present invention, the cover comprises a generally wedge-shaped first cover section and a plurality of nested, generally wedge-shaped, second cover sections pivotally attached to said first cover section and movable between a stowed position generally within the first cover section and a deployed position juxtaposed to the first cover section such that the first cover section and second cover sections define a circular housing within which a steering wheel is capturable.

Thus, the anti-theft device of the present invention provides a means for deterring theft of both steering wheel mounted airbags and automobiles. The present invention substantially covers the entire steering wheel such that it cannot easily be removed therefrom, such as by cutting the steering wheel. Indeed, in the preferred embodiment of the present invention, the entire rim of the steering wheel is covered, and is thus inaccessible to simple hand tools.

These, as well as other advantages of the present invention will be more apparent from the following description and drawings. It is understood that changes in the specific structure shown and described may be made within the scope of the claims without departing from the spirit of the invention.

DETAILED DESCRIPTION OF THE INVENTION

The detailed description set forth below in connection with the appended drawings is intended as a description of the presently preferred embodiments of the invention, and is not intended to represent the only forms in which the present invention may be constructed or utilized. The description sets forth the functions and sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

The anti-theft device for automobiles and airbags of the present invention is illustrated in FIGS. 1–10 which depict four presently preferred embodiments of the invention.

Figure 1:
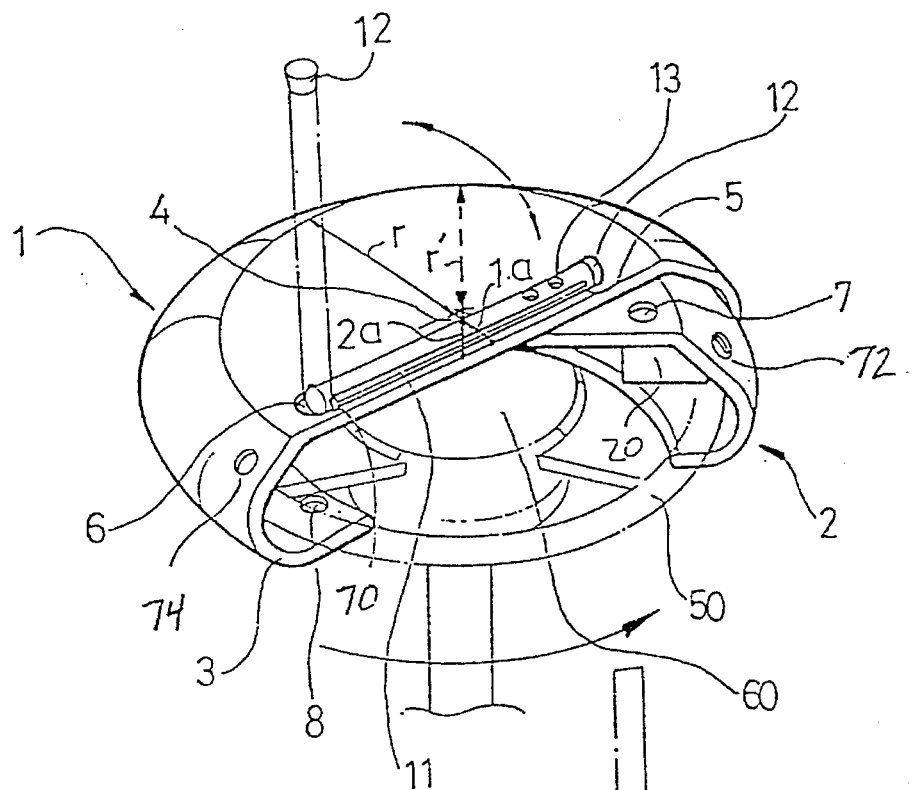
FIG. 1 is a perspective view of the first embodiment of the present invention.
Figure 2:
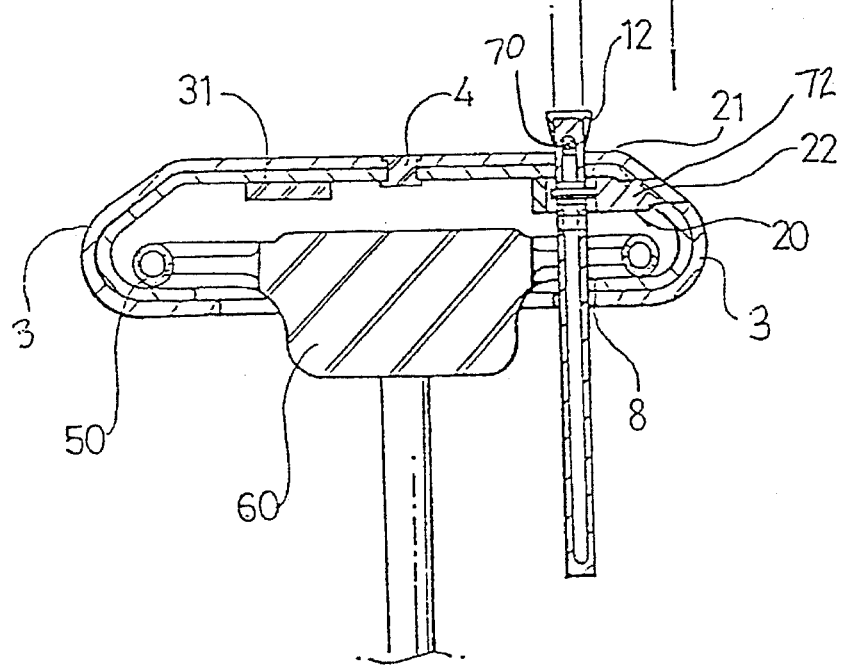
FIG. 2 is a cross-sectional side view of the device of FIG. 1.

Referring now to FIGS. 1 and 2, the first embodiment is comprised generally of a semicircular first cover section 1 and a semicircular second cover section 2 which is configured so as to be nested or disposable within the first cover section 1. The second cover section is pivotally attached to the first cover section 1 via pivot pin 4 such that the second cover section 2 has a stowed position substantially within the first cover section 1 and also has a deployed position wherein a complete circle is defined by the first 1 and second 2 cover sections so as to substantially enclose a steering wheel 50 therein.

Each of the first 1 and second 2 cover sections comprises a downturned lip 3 which extends about the entire periphery of the first 1 and second 2 cover sections and which is configured so as to extend a sufficient distance around the rim of a steering wheel 50 so as to secure the present invention to the steering wheel. The lip preferably extends at least approximately 120 degrees, preferably 180 degrees, downwardly and around the rim of the steering wheel 50 so as to both lock the device to the steering wheel 50 and also substantially limit access to the steering wheel 50. Thus, the present invention cannot be removed from the steering wheel 50 by merely cutting the rim of the steering wheel 50 as with prior art devices.

A bar 12 is preferably pivotally disposed upon said first cover section 1 such that the bar 12 has a stowed position (as shown in solid lines in FIG. 1) in laminar juxtaposition to the first cover section 1 and has an extended position (as shown in solid lines in FIG. 2). The bar 12 is releasably held in the stowed position via at least one detent 5. Those skilled in the art will appreciate that various different means for releasably maintaining the bar 12 in the stowed position are likewise suitable.

The bar 12 preferably comprises a slot 11 which extends transversely therethrough along the length thereof. A pin 70, best shown in FIG. 2, is formed to the first cover section 1 and extends through the slot 11 formed within the locking bar 12 so as to both allow the locking bar 12 to pivot thereabout and also to allow the locking bar 12 to slide downward through first 6 and second 8 holes formed in the first cover section 1, as well as first hole 7 formed in the second cover section 2 when the second cover section 2 is in the deployed position thereof.

A lock 20 is mounted to the second cover section 2 and comprises a plunger 72 which extends through the hole 74 in the first cover section 1 so as to lock the second cover 2 in the deployed position thereof. The plunger 72 preferably comprises a keyway such that inserting a key therein and rotating the key allows the plunger to be depressed so as to facilitate movement of the second cover section 2 to the stowed position thereof.

With particular reference to FIG. 2, the lock 20 both secures the second cover section 2 in the deployed position thereof and secures the bar 12 in the deployed position thereof. Those skilled in the art will appreciate that various different mechanical and/or electrical locking devices are suitable for use in the present invention.

Thus, to utilize the present invention, the second cover section 2 is placed in the stowed position thereof and the device is inserted over a steering wheel 50 so as to cover approximately one-half thereof. The second cover section 2 is then rotated out of the stowed position to the deployed position thereof such that the aperture 6 formed in the first cover section 1 aligns with the aperture 7 formed in the second cover section 2. The plunger 72 of lock 20 extends into hole 74 so as to lock the second cover section 2 in the deployed position thereof. The distal end of the bar 12 is then lifted so as to rotate the bar 12 about the pin 70 and the bar 12 is then slid through holes 6 and 8 formed in the first cover 1 and hole 7 formed in the second cover 2. The lock 20 is configured so as to both secure the first 1 and second 2 covers upon the steering wheel and to maintain the bar 12 in the extended position thereof. Thus, the lock 20 must be unlocked in order to facilitate removal of the device from the steering wheel 50.

Optionally, an alarm 31 may be disposed within the first 1 and/or second 2 covers and configured so as to sound if an attempt is made to remove the present invention from the steering wheel 50 without first unlocking the lock 20.

Figure 3:
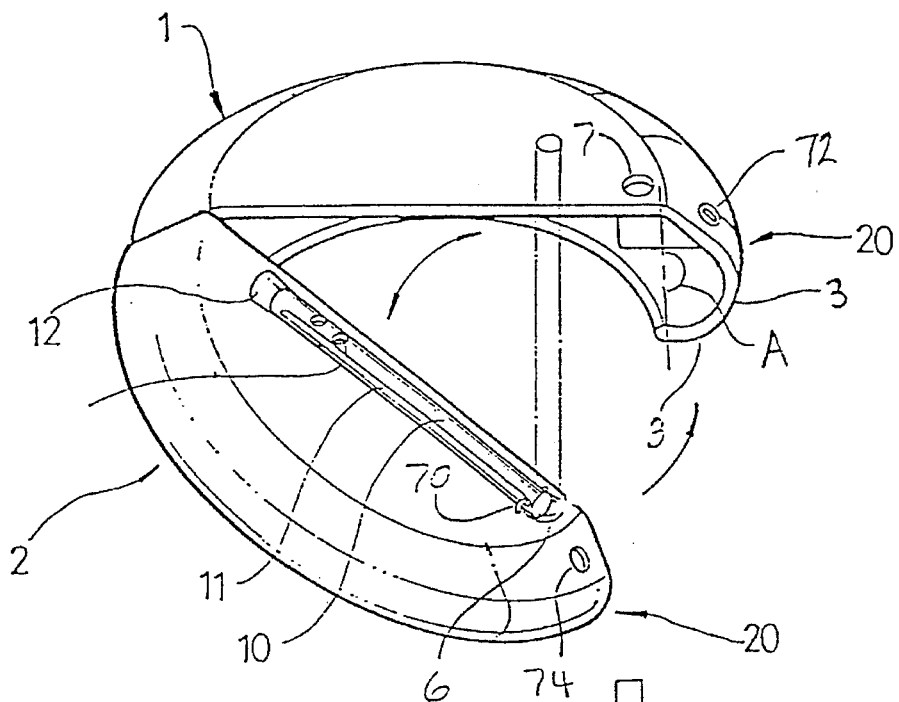
FIG. 3 is a perspective view of a second embodiment of the present invention.
Figure 4:
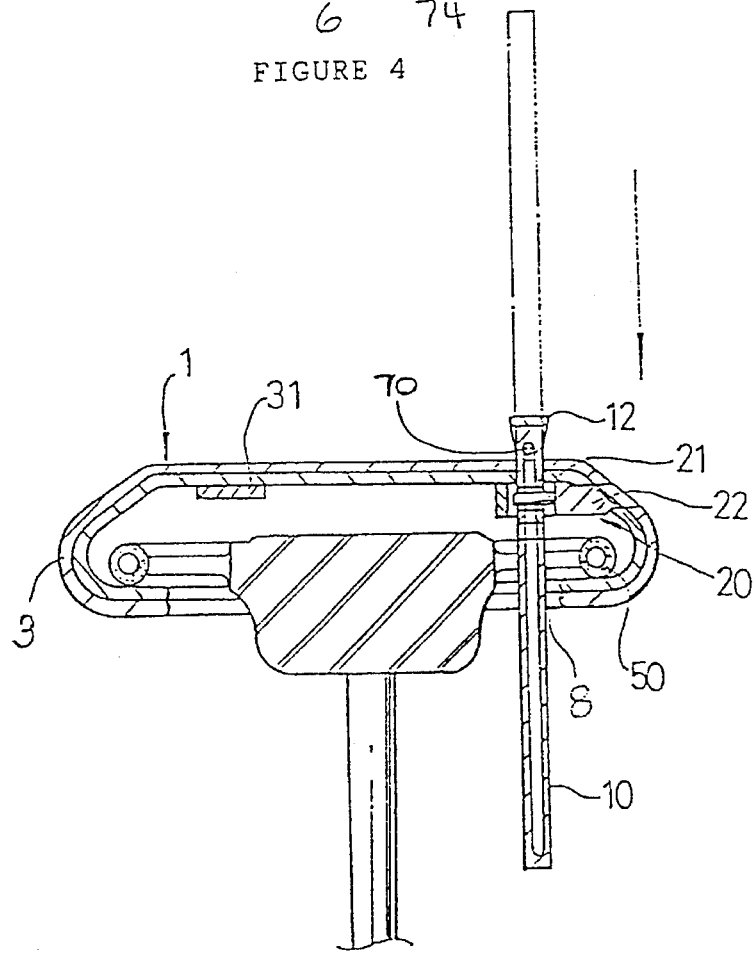
FIG. 4 is a cross-sectional side view of the device of FIG. 3.

The downturned lip 3 is formed about the entire periphery of each of the first 1 and second 2 cover sections and it extends, i.e., curves downwardly and inwardly, at least 120 degrees, preferably approximately 180 degrees as shown by angle A in FIG. 3, which is exemplary of each embodiment of the present invention Referring now to FIGS. 3 and 4, the second embodiment of the present invention generally comprises a generally semicircular first cover section 1 and a generally semicircular second cover section 2 hingedly attached to the first cover section 1 such that the second cover section 2 has an open position (as illustrated in FIG. 3) wherein the second cover section 2 is sufficiently separated from the first cover section 1 so as to allow the steering wheel to be received within the first cover section 1, and also has a closed position such that the first and second cover sections generally define a circle within which the steering wheel is capturable.

Preferably, the first cover section 1 is configured so as to be partially received within the second cover section 2. Thus, a small amount of overlap, approximately ½ inch for example, exists between the first 1 and second 2 cover sections so as to prevent the introduction of any tool therebetween by a thief.

As in the first embodiment of the present invention, a bar 12 is pivotable about a pivot pin 70 and is capable of sliding through a hole 6 formed in the upper surface of the second cover section 2, a hole 8 in the lower surface of the second cover section 2, and a hole 7 in the upper surface of the first cover section 1 so as to extend from the steering wheel cover and thereby inhibit turning thereof.

This clamshell-type of construction of the second embodiment of the present invention is utilized by merely opening the first 1 and second 2 cover sections about the hinge which interconnects them to one another and then closing the first 1 and second 2 cover sections about a steering wheel 50 such that the steering wheel is trapped therein. The bar 12 is deployed as in the first embodiment of the present invention.

As in the first embodiment of the present invention, a lock 20 locks the first 1 and second 2 cover sections together, i.e., in the closed position thereof, and also locks the bar 12 in the deployed position thereof.

Figure 5:
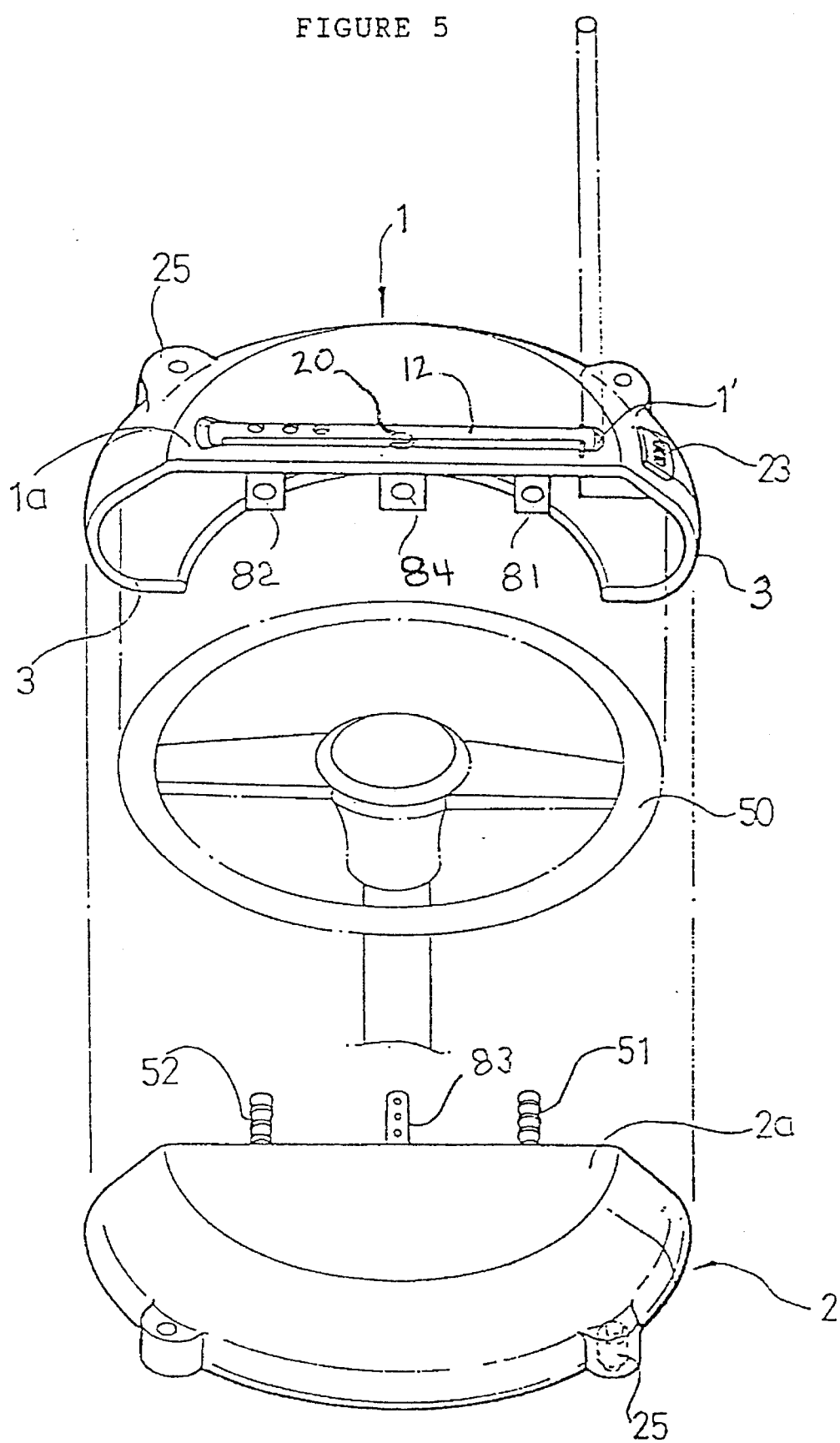
FIG. 5 is a perspective view of the third embodiment of the present invention.
Figure 6:
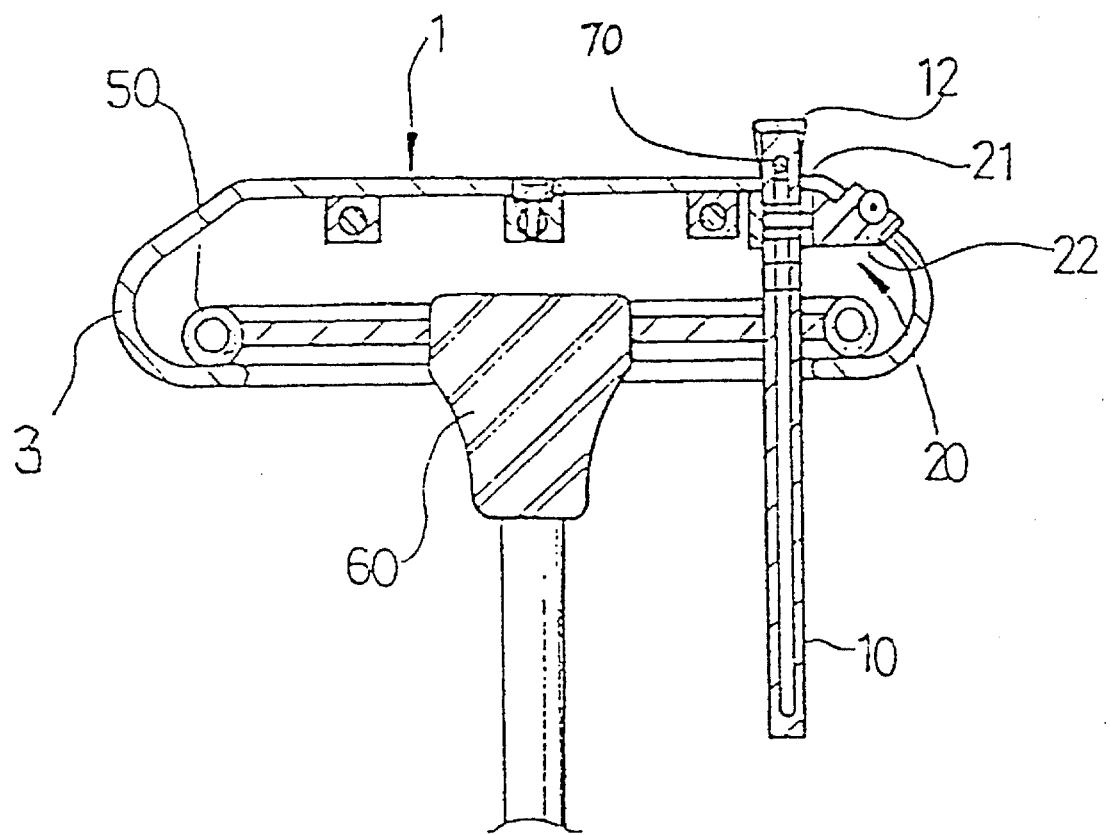
FIG. 6 is a cross-sectional side view of the device of FIG. 5.

Referring now to FIGS. 5 and 6, a third embodiment of the present invention generally comprises a generally semicircular first cover section 1 and a generally semicircular second cover section 2 removably attachable to the first cover section.

Posts 51 and 52 formed upon the second cover section 2 are received within corresponding apertures 81 and 82 formed upon the first cover section 1. Posts 51 and 52 maintain the correct orientation of the first 1 and second 2 cover sections with respect to one another when the device is installed upon a steering wheel 50. Locking post 83 is received within corresponding locking post aperture 84 so as to lock the first 1 and second 2 cover sections to one another. Lock 20 locks the locking post 83 into the locking post aperture 84.

In the third embodiment of the present invention, a separate lock 23 is preferably utilized to lock the bar 12 thereof in the extended position. Otherwise, the bar 12 is generally similar to that of the first and second embodiments of the present invention.

Optional rollers 25 are disposed about the periphery of each of the first 1 and second 2 cover sections such that the rollers 25 contact the outer periphery of the rim of the steering wheel 50 so as to facilitate turning of the first 1 and second 2 cover sections while the steering wheel 50 itself remains substantially stationary. Thus, rollers 25 further increase the difficulty of maintaining control of the steering wheel 50 after the first 1 and second 2 cover sections have been installed thereover.

Figure 7:
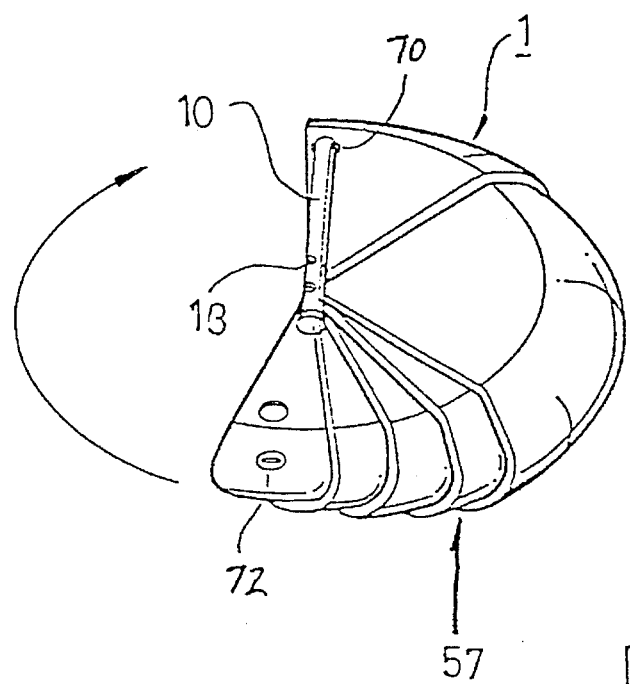
FIG. 7 is a perspective view of the fourth embodiment of the present invention.
Figure 8:
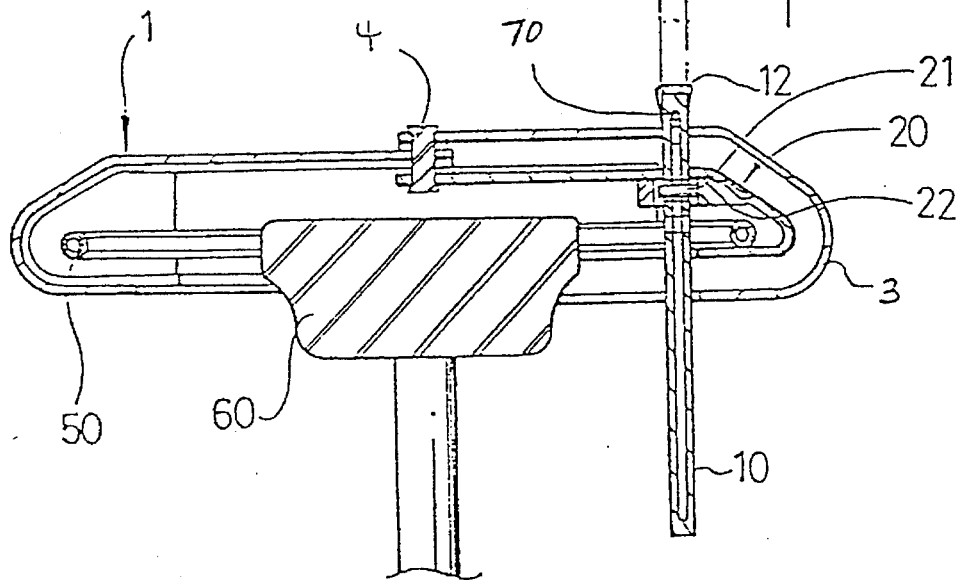
FIG. 8 is a cross-sectional side view of the device of FIG. 7.
Figure 10:
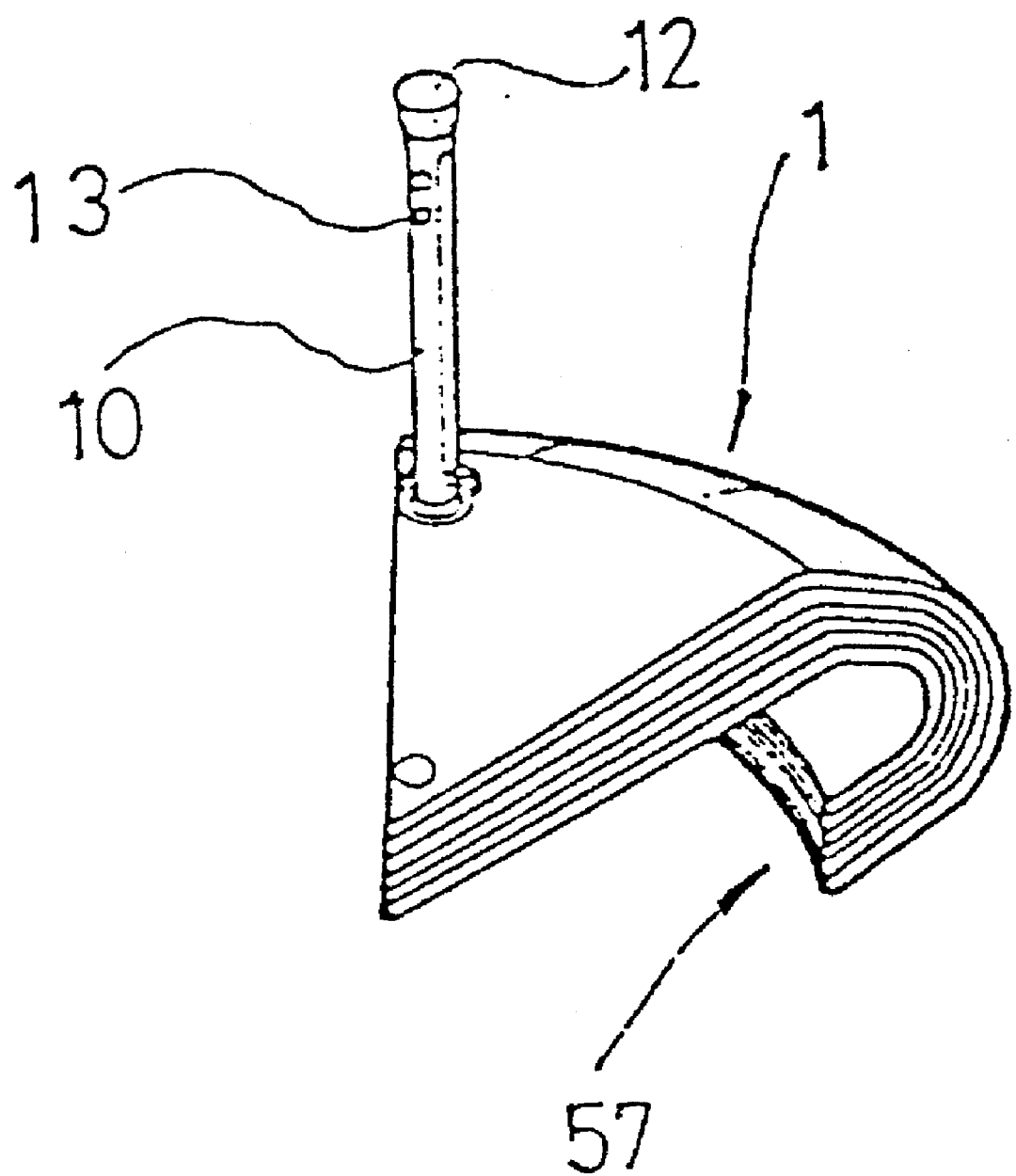
FIG. 10 is a perspective view of the fourth embodiment of FIGS. 7 and 8 showing the device completely collapsed, such as for storage.

Referring now to FIGS. 7, 8, and 10, a fourth embodiment of the present invention generally comprises a wedge-shaped first section 1 and a plurality of nested, generally wedge-shaped second cover sections 57 pivotally attached to the first cover section 1 and movable between a stowed position generally within the first cover section 1 and a deployed position juxtaposed to the first cover section 1 such that the first cover section 1 and the second cover sections 57 generally define a circular housing within which the steering wheel is capturable. As such, the fourth embodiment of the present invention generally resembles the first embodiment thereof, except that rather than defining a semicircle, the first cover section 1 defines a wedge-shaped or pie-shaped section within which a plurality of second similarly shaped cover sections 57 are stored.

The plurality of second cover sections 57 fan or telescope from the first cover section 1 about a pivot pin 4 to define a circle. As each second cover section 57 is extended from the first cover section 1, a tab or pawl formed thereon engages a portion of the next second cover section 57 to be extended and thereby pulls the next cover section 57 from the first cover section. The bar 12 and the lock 22 operate in a manner analogous to that of the first embodiment of the present invention.

Figure 9:
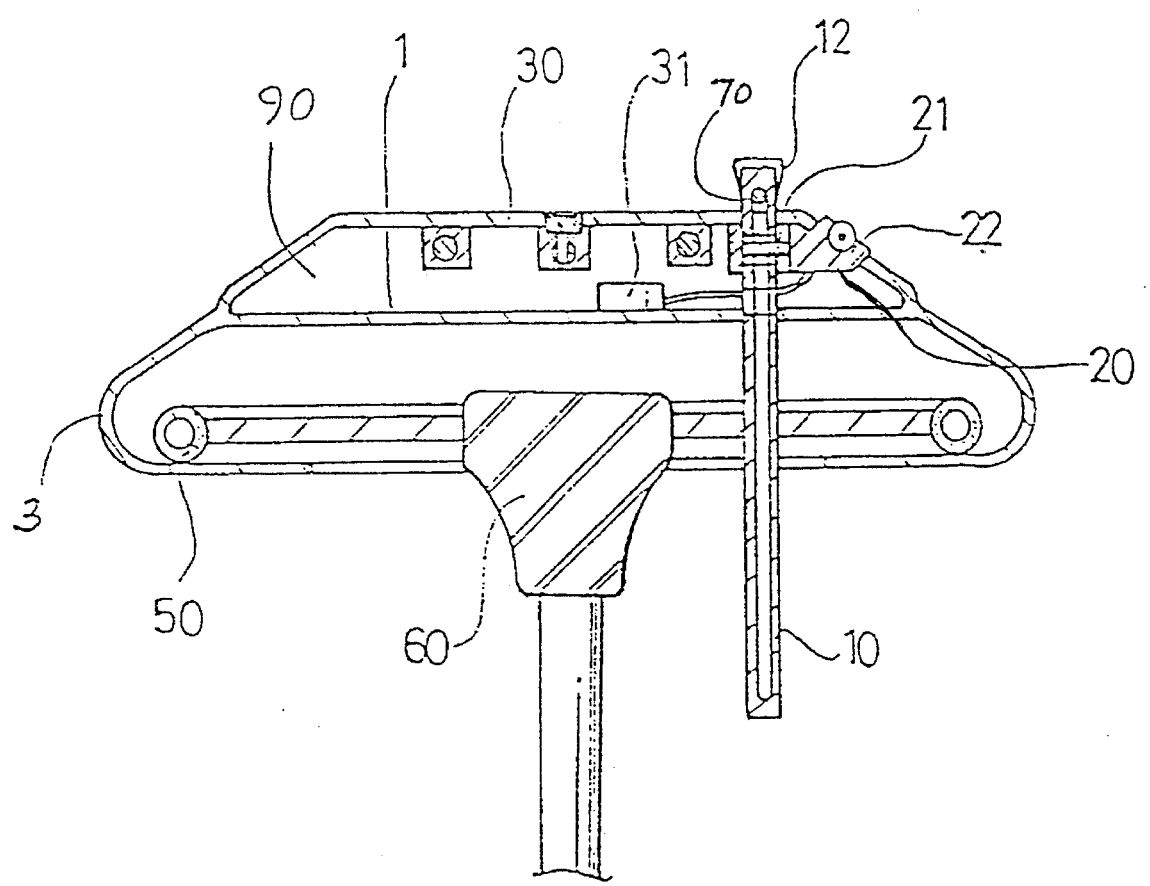
FIG. 9 is an alternative configuration of the present invention wherein an alarm is formed within a separate compartment formed to the cover of the device.

Referring now to FIG. 9, in an alternative configuration of the first and/or second cover section of any embodiment of the present invention, a separate compartment 90 is formed therein so as to contain an alarm 31 which is activated by an attempt to remove the present invention from a steering wheel without the lock 22 being unlocked. The alarm preferably comprises means for sounding at sufficient intensity, e.g., approximately 105 dB, to discourage a would-be thief from remaining within the car.

The first and second cover sections of each embodiment of the present invention are preferably comprised of a durable metal, such as steel or aluminum. Alternatively, the first and second cover sections may be formed of a durable, preferably substantially rigid, polymer material, such as ABS. Those skilled in the art will appreciate that various other durable and rigid materials are likewise suitable.

It is understood that the exemplary anti-theft device for automobiles and airbags described herein and shown in the drawings represents only presently preferred embodiments of the invention. Indeed, various modifications and additions may be made to such embodiments without departing from the spirit and scope of the invention. For example, the first and second covers may be formed in a variety of different shapes, other than so as to define a circle. Additionally, those skilled in the art will recognize that the lower surface of each cover section may be formed so as to extend as close to the hub of the steering wheel as desirable, thereby further limiting access to the steering wheel. Thus, these and other modifications and additions may be obvious to those skilled in the art and may be implemented to adapt the present invention for use in a variety of different applications.

What is claimed is:

1. A device for deterring theft of a steering wheel mounted airbag and an automobile, said device comprising:
   a) a cover configured to generally enclose a substantial portion of a steering wheel so as to inhibit access to an airbag mounted within said steering wheel and so as to inhibit use of said steering wheel, said cover being configured to fit loosely upon the steering wheel such that turning said cover does not substantially turn said steering wheel, said cover comprising:
      i) a generally semicircular first cover section;
      ii) a generally semicircular second cover section pivotally attached to said first cover section and movable between a stowed position generally within said first cover section and a deployed position juxtaposed to said first cover section such that said first and second cover sections generally define a circular housing; and
      iii) a pivot pin interconnecting said first and second cover sections;
   b) a bar pivotally attached to said cover;
   c) wherein said cover comprises front and rear surfaces, each of said front and rear surfaces comprising an opening formed therein, said cover further comprising a pivot pin formed thereon;
   d) and wherein said bar comprises a slot formed therein such that said pivot pin is received within said slot and such that said bar is pivotable between a first position in laminar juxtaposition to said cover and a second position wherein said bar is received with the openings formed in said front and rear surfaces of said cover so as to inhibit rotation of said steering wheel.

2. A device for deterring theft of a steering wheel mounted airbag and an automobile, said device comprising:
   a) a cover configured to generally enclose a substantial portion of a steering wheel so as to inhibit access to an airbag mounted within said steering wheel and so as to inhibit use of said steering wheel, said cover comprising front and rear surfaces, each of said front and rear surfaces comprising an opening formed therein, said cover further comprising a pivot pin formed thereon;
   b) a lock having locked and unlocked configurations formed to said cover, said lock and said cover configured to inhibit removal of said cover from the steering wheel when said lock is in the locked configuration thereof and configured to facilitate removal of said cover from the steering wheel when said lock is in the unlocked configuration thereof;
   c) a bar pivotally attached to said cover;
   d) wherein said cover deters theft of the airbag by inhibiting access thereto and deters theft of the automobile by inhibiting use of the steering wheel; and
   e) wherein said bar comprises a slot formed therein such that said pivot pin is received within said slot and such that said bar is pivotable between a first position in laminar juxtaposition to said cover and a second position wherein said bar is received within the openings formed in said front and rear surfaces of said cover so as to inhibit rotation of said steering wheel, 3. The device as recited in claim 2 further comprising an alarm configured so as to sound when an attempt is made to remove said cover from the steering wheel with said lock in the locked configuration thereof.

4. The device as recited in claim 3 wherein said alarm is disposed within said cover.

* * * * *